Figure 1:
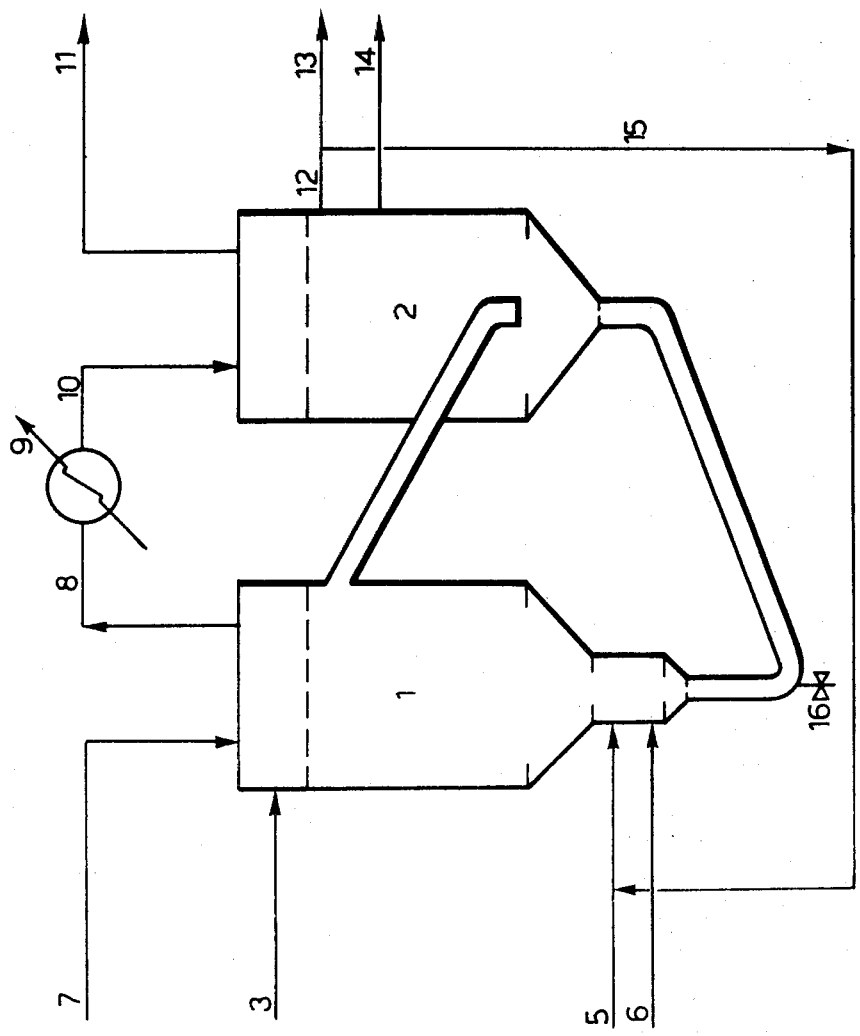

United States Patent [19]
Di Fiore et al.

[11] 3,846,334
[45] Nov. 5, 1974

[54] REACTIVATION OF ALUMINUM TRICHLORIDE-HYDROCARBON CATALYTIC COMPLEXES USED IN THE ALKYLATION OF AROMATIC COMPOUNDS

[75] Inventors: Lucio Di Fiore; Benedetto Calcagno, both of Milan, Italy

[73] Assignee: Societa Italiana Resine S.I.R. S.p.A., Milan, Italy

[22] Filed: Sept. 5, 1972

[21] Appl. No.: 286,400

[30] Foreign Application Priority Data
Nov. 17, 1971 Italy.................................. 31200/71

[52] U.S. Cl................... 252/414, 208/13, 252/415, 252/429 R, 260/671 B
[51] Int. Cl....... B01j 11/02, B01j 11/80, C07c 3/56
[58] Field of Search........ 252/411, 414, 415, 429 R; 260/671 B, 683.57, 683.74, 683.77; 208/13; 423/130, 135

[56] References Cited
UNITED STATES PATENTS
2,843,144  7/1958  Robinson et al............... 260/683.57
3,303,230  2/1967  McMinm, Jr........................ 208/13
3,355,508  11/1967  Mouldem......................... 260/671 B
3,391,210  7/1968  Feigmer et al.................. 260/671 B
3,433,846  3/1969  Adams et al..................... 260/671 B
3,478,118  11/1969  Sorgenti.......................... 260/671 B
3,657,148  4/1972  Becker et al..................... 252/429 R Primary Examiner—Patrick P. Garvin
Assistant Examiner—P. E. Konopka
Attorney, Agent, or Firm—Sughrue, Rothwell, Mion, Zinn and Macpeak

[57] ABSTRACT

Spent aluminum chloride Friedel-Crafts catalyst is regenerated in an aromatic hydrocarbon medium by supplying of powdered metallic aluminum and hydrogen chloride, the product of regeneration being passed to a separation zone in which a catalytic complex of the hydrocarbon and aluminum chloride is taken from between an upper layer constituted by the hydrocarbon and a lower layer (which is recycled) constituted by a suspension of unreacted aluminum in such a complex.

4 Claims, 2 Drawing Figures

REACTIVATION OF ALUMINUM TRICHLORIDE-HYDROCARBON CATALYTIC COMPLEXES USED IN THE ALKYLATION OF AROMATIC COMPOUNDS

The present invention relates to improvements in the processes of alkylation of aromatic compounds by using chloroalkylic alkylating agents in which the catalyst used is aluminium trichloride in the form of a fluid complex with hydrocarbons.

More particularly, the present invention relates to a process which is suitable for imparting catalytic activity to such fluid complexes which have been de-activated following their use in alkylation reactions.

Processes of the Friedel-Crafts type in which a chloroalkylic alkylating agent and an aromatic substrate react in the presence of an aluminium trichloride based catalyst, resulting in production of the alkylated product and hydrohalic acid generally take place in the liquid phase, in the presence of an excess of aromatic substrate which almost always also functions as a solvent and at a temperature ranging from room temperature to the boiling temperature of the aromatic substrate.

Aluminium trichloride is one of the most efficient catalysts in the reactions relating to alkylation of aromatic substrates and for this reason it is the one most widely used, notwithstanding the difficulties entailed by its use.

Even though aluminium trichloride may be added to the alkylation medium in solid form, in the majority of the processes developed over recent years aluminium trichloride is used in the form of a fluid complex with hydrocarbons. More particularly in such alkylation processes, what are discharged are fluid complexes of aluminium trichloride and hydrocarbons which are bereft of any catalytic activity or in which the catalytic activity is greatly reduced.

Such spent complexes are activated by the addition of solid powdered aluminium trichloride, after which they are supplied to the alkylation medium again.

The direct use of aluminium trichloride for activating such spent fluid complexes is however not very economical and moreover aluminium trichloride is a very difficult product to handle.

Therefore, in some recently developed processes, it is preferred to supply powdered aluminium to the alkylation reactor continuously so as to form aluminium trichloride in situ by reaction of the aluminium with the hydrogen chloride which develops from the alkylation process.

This method is certainly more economical and far easier to operate than that in which anhydrous aluminium trichloride is used, by reason of the difference in cost and the resistance to humidity which exists between aluminium and its halides.

Nevertheless, even this procedure is not without its drawbacks, above all on account of the development of hydrogen in the reaction between aluminium and hydrogen chloride.

Such hydrogen is in fact passed to the hydrogen chloride absorption columns in mixture with this latter and it therefore entails the possibility of forming explosive mixtures downstream of such columns. Another drawback resides in the fact that any unreacted aluminium, or the non-chlorinatable impurities present in the aluminium itself may give rise to clogging of the conveying and interception means.

It is therefore obviously desirable to improve the alkylation processes in which an aromatic substrate is alkylated by means of a haloalkylic agent in the presence of a catalyst consisting of a fluid complex of aluminium trichloride and hydrocarbons. It has now been found that the previously described drawbacks may be eliminated by the process of the present invention which consists essentially in continuously reactivating the de-activated fluid catalytic complexes comprising aluminium trichloride by, in a stage other than the reaction stage, bringing such deactivated complexes into contact with metallic aluminium and gaseous hydrogen chloride, working in the presence of a boiling solvent which generally consists of the same aromatic substrate used in the alkylation process, the consequently activated catalytic complex being separated off continuously.

According to the process of the present invention, activation of the spent catalytic complex and separation of the activated catalytic complex from the reaction medium are carried out in two intercommunicating but distinct zones.

More particularly, the spent catalytic complex, the metallic aluminium and the hydrogen chloride are brought into contact in an activation zone in a boiling liquid medium consisting of an aromatic hydrocarbon and preferably benzene.

The reagent mixture is passed directly and continuously from the activation zone to the separation zone, separation of the reagent mixture into a lighter stratum consisting essentially of the aromatic hydrocarbon, and intermediate stratum, consisting essentially of the activated catalytic complex and a heavier stratum consisting essentially of the catalytic complex which contains unreacted aluminium in suspension, takes place in this last-mentioned zone.

The heaviest stratum is carried back continuously into the activation zone while the intermediate stratum, consisting of the catalytic complex activated by aluminium trichloride, is recovered.

For better understanding of the process according to the present invention, reference is made to the attached FIG. 1 in which reference numeral 1 denotes the reactor in which the deactivated catalytic complex of aluminium trichloride is activated while 2 denotes the zone in which the activated complex is separated from the other constituents of the reaction mixture.

More particularly at the top of the reactor 1, the de-activated catalytic complex is supplied through the pipe 3, while the pipe 7 is used for supplying the powdered metallic aluminium.

At the bottom of the reactor 1, hydrogen chloride is supplied through the pipe 6 and the aromatic hydrocarbon (generally benzene) is supplied through the pipe 5.

In addition, the working temperature is the boiling temperature of the aromatic hydrocarbon.

According to the process of the present invention, it is essential to keep the contents of the reactor 1 under brisk agitation. This agitation is carried out by the development of gases (essentially hydrogen) and vapours of the boiling aromatic hydrocarbon. The particular form of the reactor 1 illustrated in FIG. 1 favours agitation of the reagent mixture. The vapours from the boiling aromatic hydrocarbon are recovered through the pipe 8, condensed in the condenser 9 and are then passed into the separation zone 2 through the line 10.

The reaction mixture overflows continuously from the reactor 1 into the separation zone 2 in the manner illustrated in FIG. 1 attached.

Thus, in the separator 2, the lighter stratum, consisting essentially of aromatic hydrocarbon, is separated. This light stratum is recovered through the pipe 12 and is discharged through the pipe 13, or the light stratum may be recycled at least partly to the reactor 1 through the pipe 15. It is possible to control the development of heat in the reactor by introducing liquid aromatic hydrocarbon into the reactor 1.

The intermediate density phase, consisting essentially of the activated catalytic complex comprising aluminium trichloride is recovered through the pipe 14.

In the bottom part of the decantation zone 2, a stratum is separated which consists essentially of the catalytic complex containing metallic aluminium in suspension.

With the particular embodiment of FIG. 1, this heavy stratum is carried back to the bottom of the activation zone 1 by the effect of the differing density of the constituents in the two zones mentioned.

In this respect, it is desirable to maintain the contents in the reactor 2 at levels of temperature not exceeding 80°C and preferably ranging from 30° to 60°C.

The incondensable gases constituted by hydrogen with small quantities of hydrogen chloride, are discharged through the pipe 11.

From the bottom of the apparatus through the pipe 16, the non-chlorinatable products contained in the metallic aluminium are drained off from time to time.

According to the process of the present invention, catalytic complexes of aluminium trichloride and hydrocarbons are obtained which are highly active in the processes of alkylation of aromatic compounds by means of chloroalkylic alkylating compounds.

Such active complexes are obtained from metallic aluminium which constitutes a low priced available product which is more easily handled than aluminium trichloride.

Furthermore, working according to the present invention avoids the dangers of some processes in the prior art, inherent in the formation of explosive mixtures downstream of the columns for processing hydrogen chloride originating from the alkylation process.

Proceeding in the manner described also ensures the absence of unreacted aluminium in the alkylation zone so that clogging of conveying and intersection means is also avoided.

Finally, it has been found that by proceeding according to the present invention, high yields are achieved in the reaction between aluminium and hydrogen chloride, the said yields being in any case greater than approximately 90% with respect to the hydrogen chloride used.

The process of the present invention is particularly applicable to the formation of linear alkyl benzenes having 9 to 16 carbon atoms in the side chain.

These alkyl benzenes, useful as intermediate agents in the synthesis of biologically degradable detergents, are obtained, according to a known process, by partial chlorination with chlorine from linear paraffins having from 9 to 16 carbon atoms per molecule, alkylation of benzene by means of such chlorinated products catalysed by active complexes of aluminium trichloride and hydrocarbons and fractional distillation of the products of alkylation after separation of the catalyst. In such processes, chlorination is carried out with high molar ratios of n-paraffins/chlorine, and preferably 3:1 to 2:1, this in order to ensure a high yield of monochloroparaffins.

In this way, a mixture consisting of chlorinated n-paraffins and unaltered n-paraffins is passed to the alkylation process.

In addition, alkylation is carried out with an excess of benzene, the molar ratio of benzene to chloroparaffins being from 5:1 to 15:1 and preferably around 10:1, the reaction temperatures being comprised in the range from ambient temperature (approximately 20°C) to the boiling temperature of benzene in the reaction mixture.

From the alkylation phase, the product is then separated from the spent catalytic complex comprising aluminium trichloride.

This spent complex is reactivated by the process according to the present invention in the manner previously described.

More particularly with reference to FIG. 1, the process is carried out in the activation reactor 1 in the presence of benzene, at the temperature at which this compound boils (approximately 80°C).

The spent catalytic complex is supplied to the reactor 1 with an aluminium trichloride content of approximately 20 to 40% by weight, the quantity of powdered metallic aluminium being measured in such a way as to form from 5 to 25% by weight of aluminium trichloride with respect to the spent complex, values around 10% by weight being preferred.

The activated catalytic complex is then discharged from the separation zone 2 (FIG. 1 attached) and passed to the alkylation phase.

The quantity of activated catalytic complex supplied to the alkylation phase is such as will permit a concentration of this complex of 1 to 15% by weight with respect to the content in the alkylation reactor, the preferred values being around 3 to 5% by weight. The method of the present invention has been described mainly in relation to the alkylation of benzene with chlorinated n-paraffins in the formation of alkyl benzenes which may be used as a raw material for biodegradable detergents.

It is however obvious that the process described may be used in the regeneration of catalytic complexes of aluminium trichloride which have been deactivated following their use in the alkylation of aromatic compounds other than benzene by means of any type of chloroalkylic compound or generally any halogen derivative which is capable of giving rise to reactions of the Friedel-Crafts type.

Example

Figure 2:
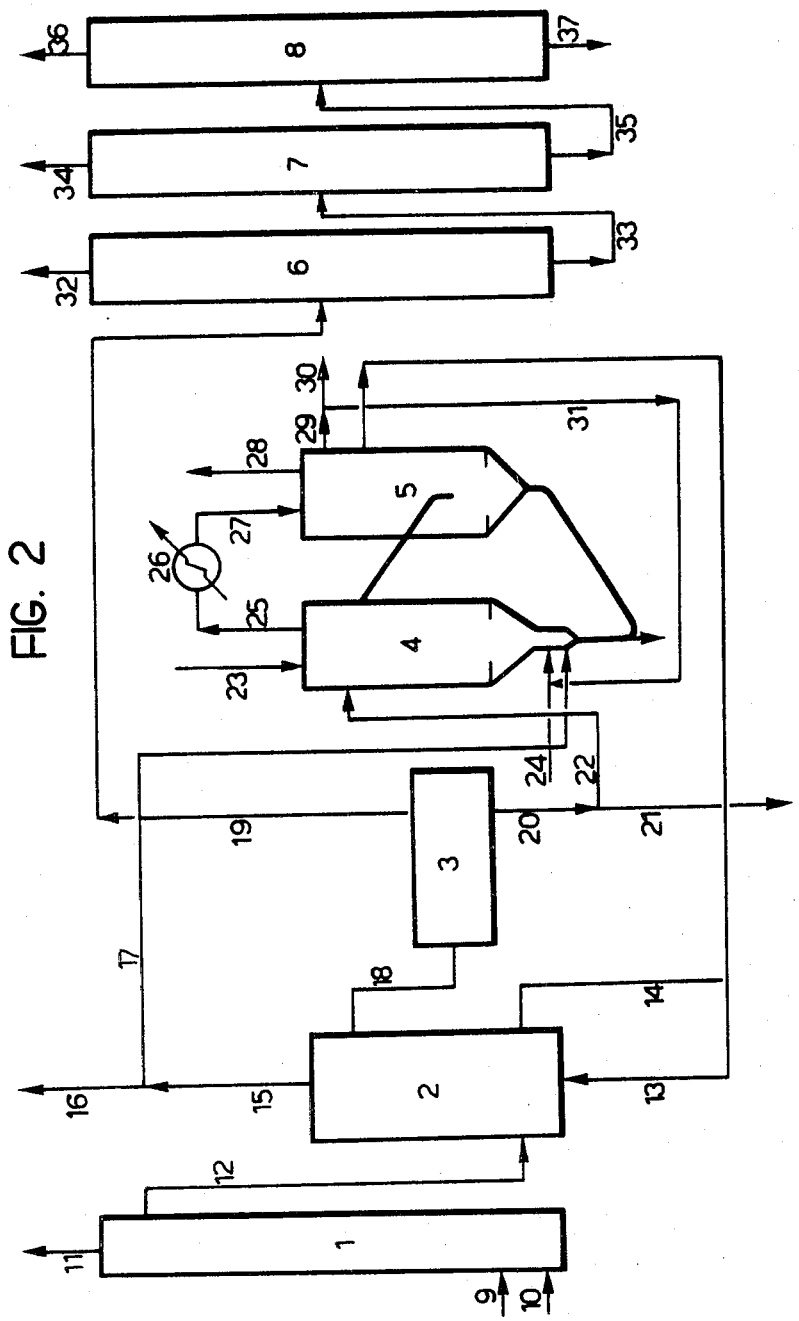

Referring to the attached FIG. 2, 1,200 kg/hr of linear paraffins having the following composition, determined by gas chromatographic analysis: n-C10 : 15.4%; n-C11 : 40.2%; n-C12 : 31.1%; n-C13 : 10.9%; and n-C14 : 2.4% (by weight) are fed to the chlorination reactor 1 through the pipe 9. The normal paraffins have a mean molecular weight equal to approximately 162.2, the average number of carbon atoms per molecule being equal to approximately 11.5.

The paraffins supplied to the reactor 1 are moreover constituted by approximately 28% fresh paraffins, the remaining percentage consisting of recycled paraffins.

Approximately 146 kg/hr of gaseous chlorine are fed to the foot of the reactor 1 through the pipe 10. In the reactor 1, chlorination is carried out at the temperature of approximately 115°C.

The hydrogen chloride is discharged through 11 and through 12 is discharged the mixture of chlorinated paraffins and unaltered paraffins which are supplied to the alkylation reactor 2.

1,600 kg/hr of benzene are fed to the reactor 2 through the pipe 14 and 190 kg/hr of activated catalytic sludge is supplied through the pipe 13.

Alkylation is carried out at 70°C, the dwell time being equal to 1 hour.

Through the pipe 15, the hydrogen chloride is discharged, a fraction (approximately 15 kg/hr) of which supplied to the activator 4 through the pipe 17. Through the pipe 18 are discharged the products of alkylation which are subjected to decantation in the decanting vessel 3.

In the said decanting vessel, the spent catalytic complex is separated from the aluminium which is discharged through the pipe 20 and partly (approximately 40 kg/hr) discharged through the pipe 21, the remaining portion being fed to the activation reactor 4 through the pipe 22.

In addition to the hydrogen chloride, approximately 2.8 kg/hr of powdered aluminium is supplied to the reactor 4 through the pipe 23.

The spent catalytic complex is activated in the reactor 4 in a benzene ambient and at the temperature at which the said compound boils (approximately 80°C).

The benzene vapours are discharged through the pipe 25, condensed in the exchanger 26 and passed into the separator 5 through the pipe 27.

The incondensable products consisting essentially of hydrogen, with just small quantities of hydrogen chloride, are discharged through the pipe 28.

Through the pipe 29, the benzene phase is drawn off from the separator 5 and is recycled to the activator 4 through the pipe 31. The temperature in the separator 5 is maintained at approximately 60°C and through the pipe 13, approximately 190 kg/hr of activated catalytic complex is drawn off and fed to the alkylator 2.

Through the pipe 24, benzene is supplied in such a quantity as will compensate for the fraction carried away with the activated catalytic complex.

From time to time, the benzene used in activation of the spent catalytic complex is drawn off through the pipe 30 in order that it may be purified.

Through the pipe 19, the alkylate is extracted from the decanting vessel 3. This alkylate is washed in an aqueous solution of sodium hydroxide then with water to neutrality. Finally, the alkylate is subjected to fractional distillation, the benzene being separated in the column 6, through the pipe 32. This benzene is recycled to the alkylation stage.

At the head of the column 7, through the pipe 34, the n-paraffins are drawn off and are recycled to the chlorination stage.

At the head of the column 8, through the pipe 36, alkyl benzenes are drawn off in quantities equal to approximately 400 kg/hr.

At the foot of the column 8, through the pipe 37, the heavy by-products are separated.

Pipes 33 and 35 are transfer pipes.

We claim:

1. A continuous process for the reactivation of catalytic complexes of aluminium trichloride and hydrocarbons which have become deactivated following their use in reactions for the alkylation of aromatic compounds with chloroalkylic alkylating agents, characterized in that:

in an activation zone, the deactivated aluminium trichloride-hydrocarbon catalytic complex, metallic aluminium in powder form and gaseous hydrogen chloride are brought into contact in a reaction medium constituted by benzene which is maintained in a boiling condition, and wherein said metallic aluminum in powder form is added in a quantity to form from 5 to 25% by weight of aluminum trichloride with respect to said deactivated complex;

the reagent mixture is continuously transferred from the said activation zone to a separation zone maintained at a temperature not exceeding 80°C, in which an upper light stratum is formed which consists essentially of benzene, an intermediate stratum which consists essentially of the activated aluminium trichloride and hydrocarbon complex and a bottom heavier stratum consisting essentially of the catalytic complex which contains unaltered metallic aluminium in suspension;

the stratum of benzene is continuously discharged, the said benzene being recycled to the activation zone;

the stratum of activated aluminium trichloridehydrocarbon catalytic complex is continuously discharged from the said separation zone;

the heavy stratum containing the catalytic complex and the aluminium suspended therein is continuously recycled from the separation zone to the activation zone.

2. Process according to claim 1, characterised in that the deactivated catalytic complexes of aluminium trichloride and hydrocarbons are those which emanate from the alkylation phase of processes in which linear alkyl benzenes are prepared in which linear paraffins having from 9 to 16 carbon atoms per molecule are partially chlorinated with chlorine, the benzene is alkylated by means of such chlorinated products.

3. Process according to claim 1, characterized in that the temperature in the separation zone is maintained from 30° to 60°C.

4. Process according to claim 1, characterized in that the benzene recycled to the activation zone is recycled after a purification treatment.

* * * * *